(12) United States Patent
Wishstar

(10) Patent No.: US 8,907,261 B1
(45) Date of Patent: Dec. 9, 2014

(54) ELECTROMAGNETIC WAVE DETECTION

(76) Inventor: Steve Wishstar, Golden, CO (US)

(*) Notice: Subject to any disclaimer, the term of this patent is extended or adjusted under 35 U.S.C. 154(b) by 203 days.

(21) Appl. No.: 13/460,028

(22) Filed: Apr. 30, 2012

Related U.S. Application Data

(60) Provisional application No. 61/559,472, filed on Nov. 14, 2011, provisional application No. 61/480,060, filed on Apr. 28, 2011.

(51) Int. Cl.
*G01C 21/02* (2006.01)
*G01B 11/26* (2006.01)
*G01J 1/04* (2006.01)

(52) U.S. Cl.
CPC .................................... *G01J 1/0437* (2013.01)
USPC .................................... 250/206.2; 356/141.5

(58) Field of Classification Search
CPC ...... G01S 3/7835; G01S 3/7862; G01S 3/784
USPC .................... 250/206.1, 206.2, 203.4, 203.6; 356/141.5, 140–141.4, 139.1
See application file for complete search history.

(56) References Cited

U.S. PATENT DOCUMENTS 5,604,695 A * 2/1997 Cantin et al. .................. 356/121

* cited by examiner

*Primary Examiner* — Thanh Luu
(74) *Attorney, Agent, or Firm* — Maschoff Brennan

(57) ABSTRACT

Embodiments of the invention are directed toward systems and methods for detecting a laser beam incident at a sensor. Embodiments of the invention may also determine the incident angle, the wavelength of the light, the power, and/or the pulse rate of the incident laser beam. This information can be used to conduct real time countermeasures and/or may be communicated to a control station. Some embodiments may also include a device that includes a photo detector and a m mask ask. The mask may include a plurality of line and/or circular apertures. Some of the apertures may be located on the mask to activate pixels in the top and/or bottom of the photo detector when illuminated from a zero angle (zenith). Embodiments of the invention also include methods that perform a number of related functions.

12 Claims, 18 Drawing Sheets

ELECTROMAGNETIC WAVE DETECTION

CROSS-REFERENCE TO RELATED APPLICATION

This application claims priority to Provisional U.S. Patent Application No. 61/480,060 filed Apr. 28, 2011, entitled "Electromagnetic Wave Detection", and Provisional U.S. Patent Application No. 61/559,472 filed Nov. 14, 2011, entitled "Electromagnetic Wave Detection", the disclosures of which are incorporated by reference in their entirety herein for all purposes.

BRIEF SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, and or all drawings and each claim.

Embodiments of the invention are directed toward systems and methods for detecting a laser beam incident at a sensor. Embodiments of the invention may also determine the incident angle, the wavelength of the light, the power, and/or the pulse rate of the incident laser beam. This information can be used to conduct real time countermeasures by the satellite and/or may be communicated to a control station. Some embodiments may also include a device that includes a photo detector and a m mask ask. The mask may include a plurality of line and/or circular apertures. Some of the apertures may be located on the mask to activate pixels in the top and/or bottom of the photo detector when illuminated from a zero angle (zenith). Embodiments of the invention also include methods that perform a number of related functions.

BRIEF DESCRIPTION OF THE DRAWINGS

Illustrative embodiments of the present invention are described in detail below with reference to the following figures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Like numerals within the drawings and mentioned herein represent substantially identical structural elements. Each example is provided by way of explanation, and not as a limitation. For instance, features illustrated or described as part of one embodiment may be used on another embodiment to yield a further embodiment. Thus, it is intended that this disclosure includes modifications and variations.

Embodiments of the invention include sensors and/or methods that can be used to detect an incident laser beam on a satellite system. Some embodiments can determine the geo-location of the laser source; provide a real-time warning to satellite components; provide communication to satellite operators; and/or determine and monitor the wavelength, power, and/or pulse rate of the laser source. Embodiments of the invention can determine the incident angle of a laser beam to within less than 10 arc-minutes, 5 arc-minutes, 1 arc-minute, or 0.5 arc-minutes. Moreover, embodiments of the invention can include a sensor that is less than 1 kg, uses less than 5 W of power, and/or has a large field of view (greater than 90°, 100°, 110°, 120°, 130°, 140°, etc.

Embodiments of the invention can be used to quickly determine whether a laser beam has been detected. Processes and systems have been optimized to speed up the determination and/or notification of a laser beam interaction as well as the determination of the incident angle of the laser beam among other things.

Figure 1:
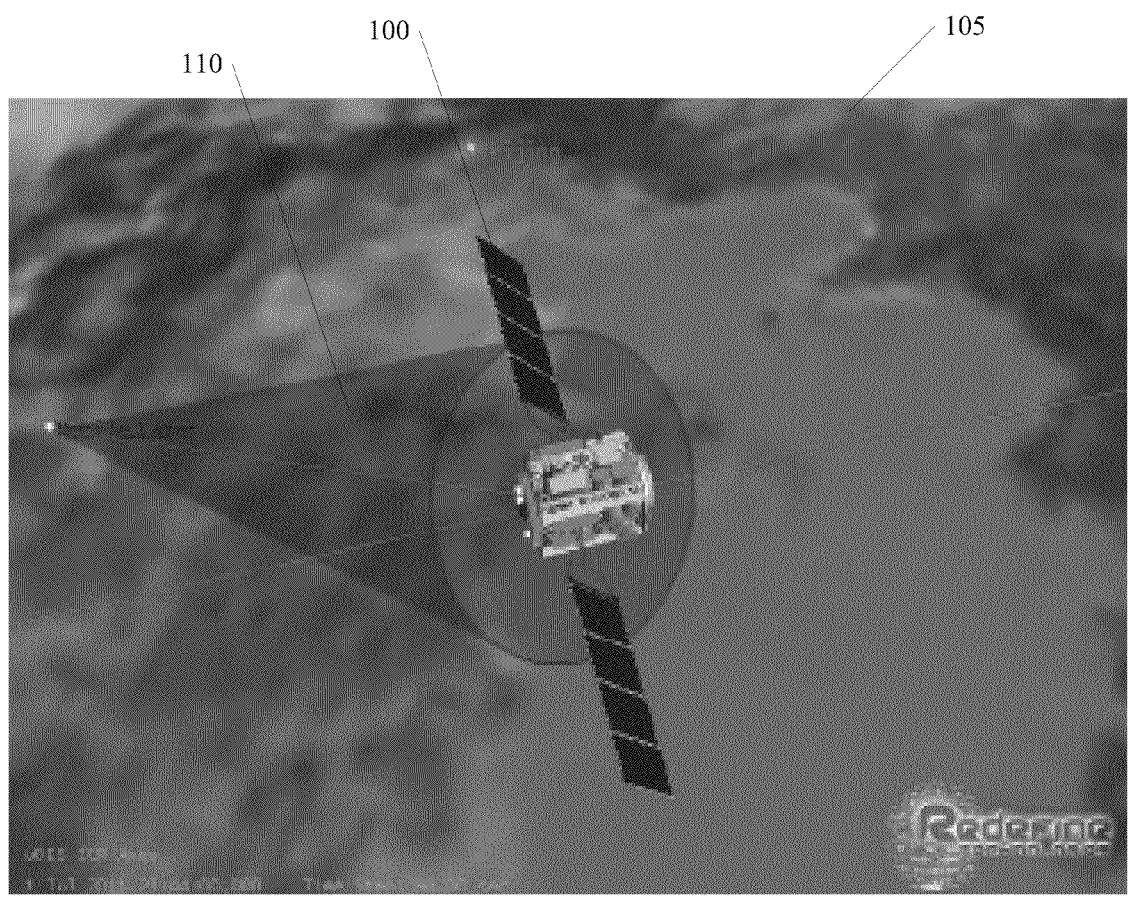
FIG. 1 shows a laser beam incident on an orbiting satellite.

FIG. 1 shows satellite 100 orbiting Earth 105. As shown in the figure, satellite 100 is struck by laser beam 110 that originates from Earth 105. Such an incident laser beam could be catastrophic to the sensors used on the satellite, especially imaging sensors. For instance, the laser beam could temporarily dazzle and/or permanently damage any optics and/or electronics within satellite 100. Embodiments of the invention provide sensor capabilities that can provide real time notification of such an event as well as provide the location of the laser beam source.

Figure 2A:
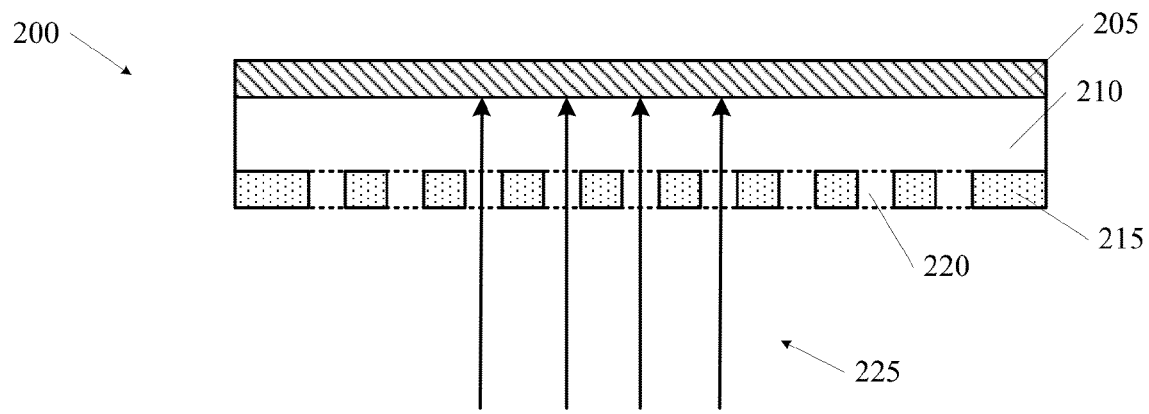
FIGS. 2A, 2B, and 2C show a sensor with light incident from various angles according to some embodiments of the invention.

FIG. 2A shows a cross section of directed energy device 200 that can provide the incident angle of a laser beam according to some embodiments of the invention. Directed energy device 200 can include sensor 205 and mask 215 separated by gap 210, which can be from 0.5 mm to 1.5 mm. Sensor 205 can include any photo detector with an array of pixels. For example, sensor 205 can be a CMOS sensor, an active pixel sensor, or a CCD sensor. Sensor 205, for example, can include a pixel array that includes millions or billions of pixels. As sensor technology increases over time, the number of pixels that may be included within sensor 205 may increase accordingly.

Figure 4:
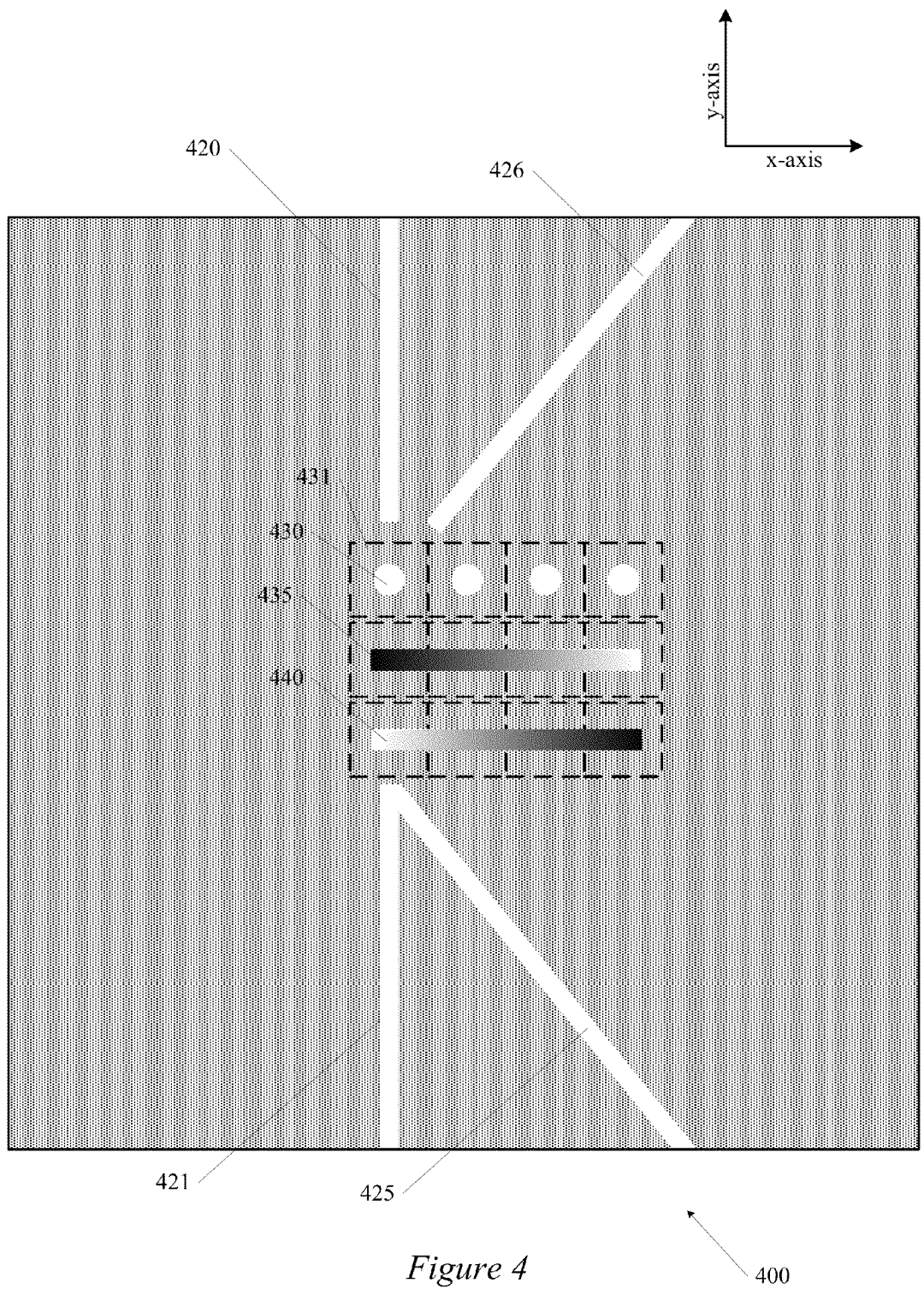
FIG. 4 shows an example of a K-mask design according to some embodiments of the invention.
Figure 5:
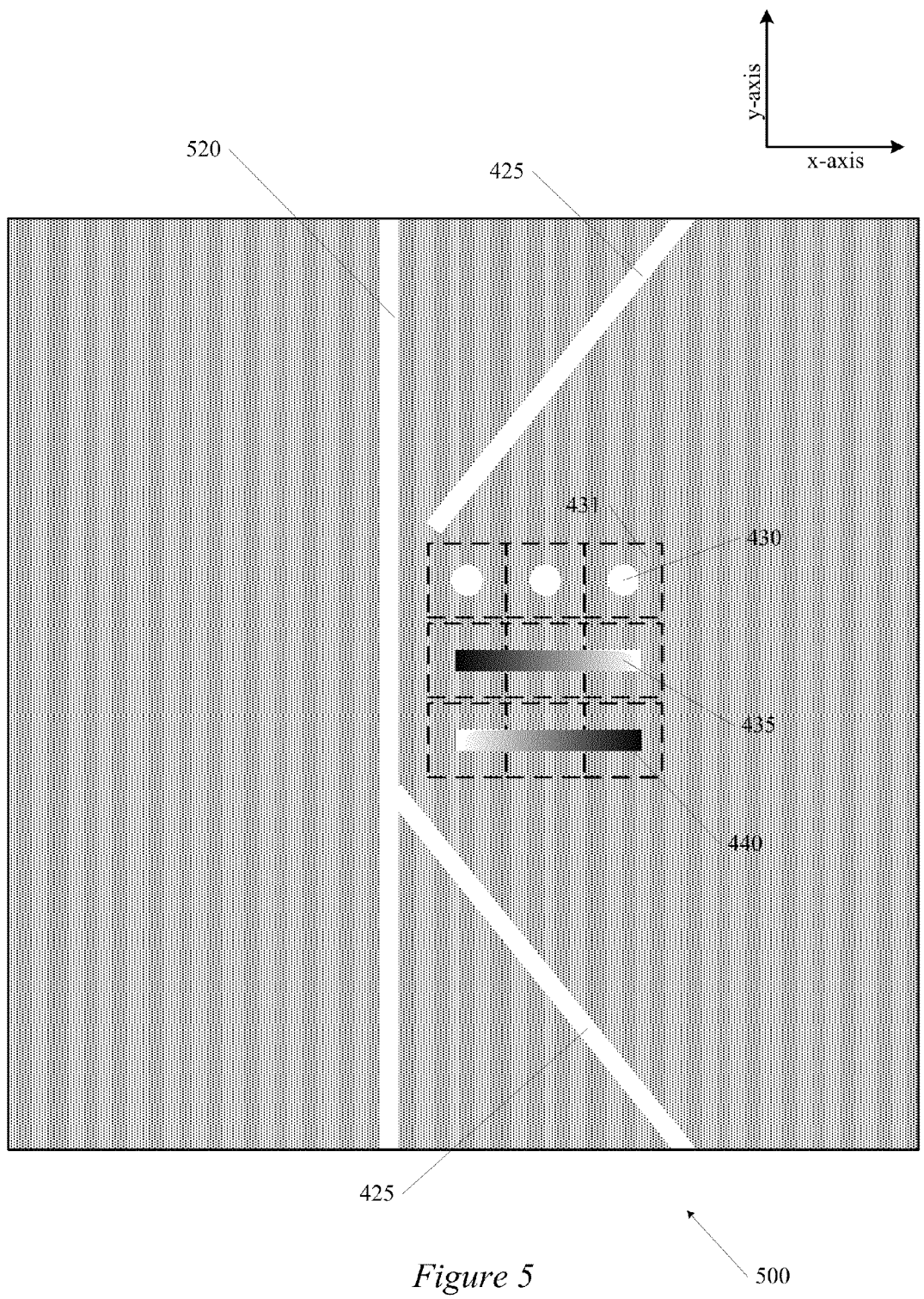
FIG. 5 shows an example of a continuous K-mask design according to some embodiments of the invention.
Figure 6:
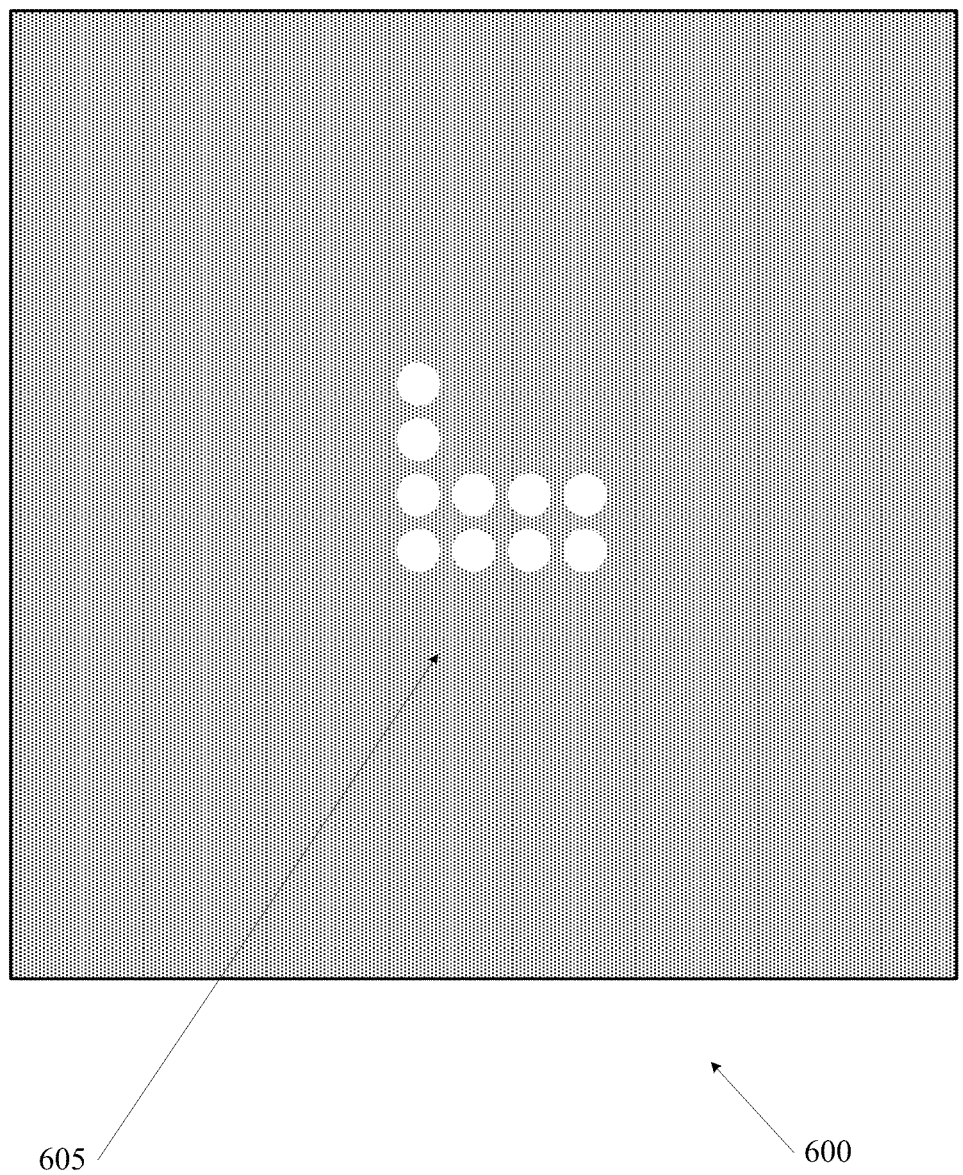
FIG. 6 shows an example of an L-mask design according to some embodiments of the invention.

Mask 215 can include a layer of thin material with a plurality of apertures (holes) 220. Mask 215 can have a thickness that varies from half a micron to millimeters. For example, mask 215 can have a thickness of 0.5, 1.0, 1.5, 2, 2.5, 5, 10, 15, 20, 30, or 40 microns. In some embodiments a thicker masks can result in more light being blocked at angles other than the zero angle. These apertures can be arranged in a number of patterns as shown in FIGS. 4, 5 and 6. Any other type of aperture pattern may be used. The size (e.g., diameter or width of the apertures) can vary depending on the number, density, and/or size of the pixels of the sensor. FIG. 2A shows light rays incident on sensor 205 after passing through apertures 220. These light rays are incident on the sensor from the zero angle (or from the normal). As shown, light rays 225 are incident on sensor directly beneath apertures 220 and, therefore, activate a set of pixels at this location. The location of the activated pixels can be used for calibration, comparison, and/or calculation purposes.

Figure 2B:
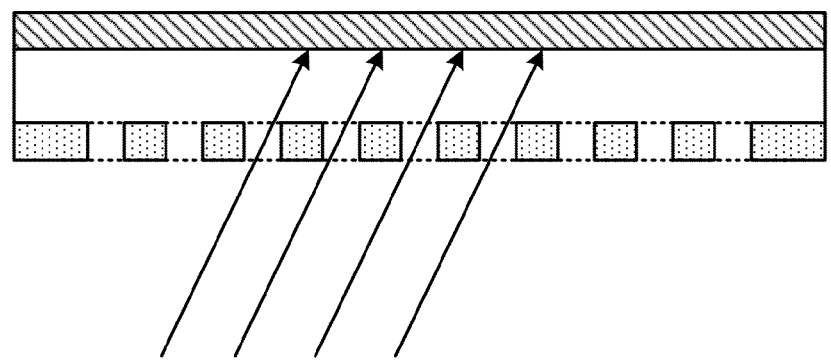
Figure 2C:
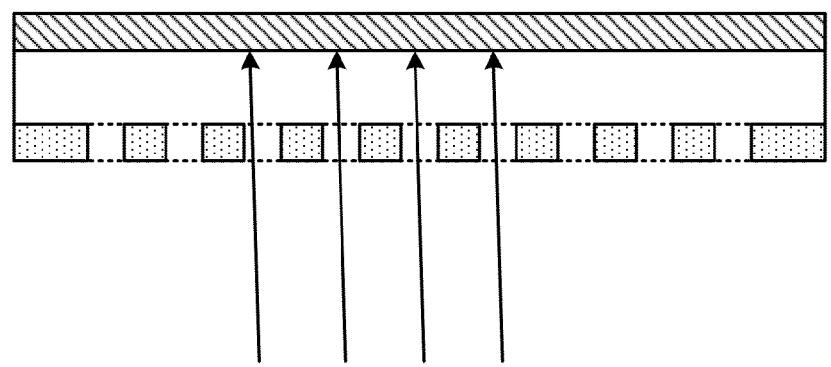

FIG. 2B show light rays incident from an angle relative to the zero angle. These light rays activate a different set of pixels. FIG. 2C shows light rays incident from yet another angle relative to the zero angle. And these light rays activate yet a different set of pixels. There may be some overlap in the pixels activated by light incident from different angles. And, while FIGS. 2A, 2B, and 2C show the incident angle varying in one dimension (e.g., along the x-axis) light may be incident from two dimensions (e.g., along the y-axis as well). By noting the activated pixels through the mask the incident angle can be determined.

FIGS. 2A, 2B and 2C are not drawn to scale.

Figure 3:
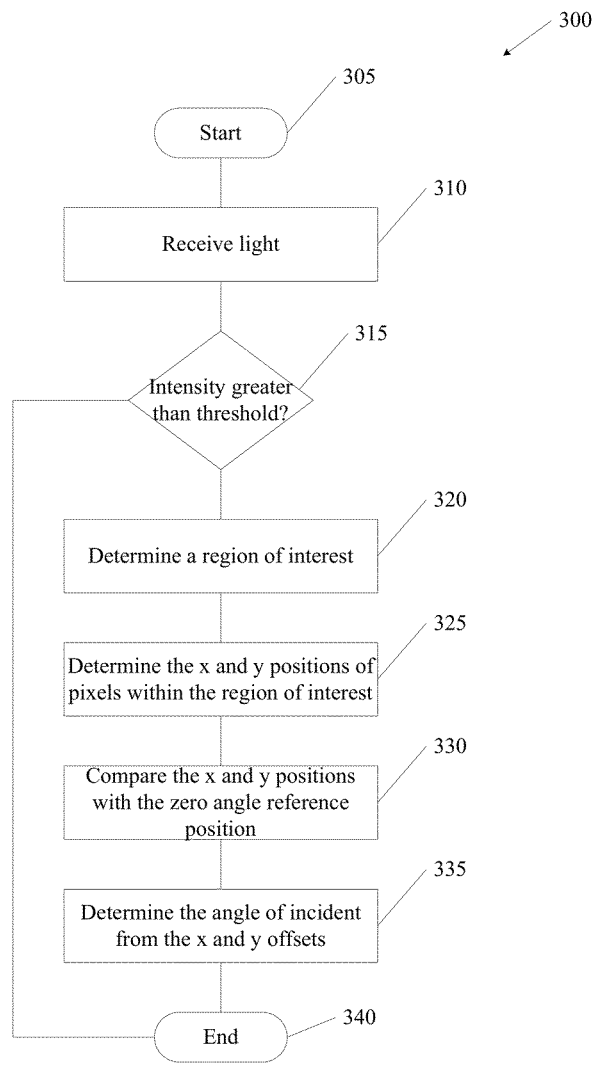
FIG. 3 is a flowchart of a process for determining the incident angle of a laser beam according to some embodiments of the invention.

FIG. 3 is a flowchart of process 300 that can be used to determine the incident angle of an incoming laser beam at a satellite. Process 300 can start at block 305. At block 310 processes 300 receives light from a laser. At block 315 it is determined whether the intensity of the received light is greater than a threshold value to preclude stray light, non-damaging laser light, or non-laser light from activating process 300. If the light intensity is lower than a threshold value than process 300 ends at block 340.

At block 320 a region of interest can be identified based on the activated pixels. A number of algorithms or processes can be used to make this determination. Some are described below. Once the region of interest has been determined the x and y positions of the activated pixels within the interest can be determined at block 325. At block 330 the x and y positions of the activated pixels can be compared with the x and y positions of a zero angle reference position. This zero angle reference position can be determined during calibration by illuminating the sensor and mask from the zenith position (e.g., the zero angle or an angle perpendicular to the sensor and/or mask), and noting the positions of the activate pixels. X and y offsets from the zero angle reference position can then be determined. From these offsets the incident angles can be determined at block 335 and process 300 can then end at block 340.

Following block 335 or 340 the incident angle can be stored in memory and/or communicated to a command center or computer on Earth. The time and/or intensity of the light may also be noted, stored in memory and communicated to a command center or computer on Earth. After block 335 or 340 or in conjunction therewith, process 300 can record the intensity, wavelength, and/or pulse rate of the light as well as communicate either or both to a command center or computer.

Process 300 can end at block at block 340. The blocks shown in process 300 can occur in any order. Moreover, additional blocks can be added and some blocks may be eliminated.

Mask 215 can include any pattern of apertures. FIG. 4 and FIG. 5 show examples of K-mask patterns 400 and 500. FIG. 6 shows an example of L-mask 600 with an "L" shaped pattern according to some embodiments of the invention. As shown, individual apertures can include any shape or pattern. The orientation of the shapes shown in these figures may be rotated and/or flipped.

FIG. 4 includes four line-shaped apertures 420, 421, 425, and 426 that form a pattern similar to the letter "K". Line-shaped apertures 420 and 421 make up the vertical line of the "K". Line-shaped apertures 425 and 426 make up the top and bottom arms of the "K".

In some embodiments, the "K" pattern of the K-mask can be the same size as the sensor. Because of this, a laser beam incident at zero degrees (zenith) should always activate the first row of pixels (i.e. row 1 of the sensor) that includes the top half of the "K", and should always activate the last row that includes the bottom half of the "K". Therefore, no matter the incident angle, the top, bottom or both rows will be activated by a laser beam when a K-mask is used. Because of this, only the top and bottom rows of the sensor need to be scanned, which allows for quick determination of incident light angles. Therefore, a processor can scan these two rows as fast as possible (or as fast as the power budget will allow).

Because of the "K" shape in the mask, two activations should be noted on the top or bottom line of the sensor regardless of the incident angle of the light. That is, line-shaped aperture 420 and 425 can both activate the top line and/or line-shaped apertures 421 and 426 can both activate the bottom line. The distance between these two activation spots on the sensor can be determined. Along with the slope of line-shaped apertures 425 or 426 the y-offset from the zero incident angle can be determined. The x-offset can be determined by noting the difference between the left most activation point and the left most activation spot with zero incident angle. This data can aide in determining, for example, where to find precision apertures, power scales, and/or wavelength scales. Moreover, this data can also be used to find the incident angle of the laser beam.

FIG. 4 also shows a horizontal row of circular-shaped apertures 430 that can be used to more accurately determine the incident angle. Also shown is an example of region of interest 431.

FIG. 4 also shows power scale 435 that can be a line-shaped aperture in the mask that includes an intensity filter with a gradient that varies from transparent to opaque along the length of the line. In this way, the power of the incident laser beam can be determined based on the activation of the pixels beneath the line-shaped aperture that is part of power scale 435. A low power laser beam, for example, will only activate pixels beneath the more transparent portions of line-shaped aperture or power scale 435. Laser beams with higher power activate more of the pixels under the line-shaped aperture of power scale 435. The row of pixels below the power scale can be scanned. The portion of pixels that are not completely saturated can be used to indicate the power of the laser beam when compared with calibration data.

Power scale 435 can include a line in the mask that is 15 microns wide. Various other widths can be used, for example, 5 microns, 10 microns, 20 microns, 25 microns, 30 microns, 35 microns, etc. The length of the line can vary. Power scale 435 can have a gradient of coatings (e.g., $SiO_2$, SiN, oxide film, nitride film or a colored film) that allow transmittance through power scale 435 that varies from 0 to 100% (or close thereto). This gradient of material can form a neutral-density filter above the sensor.

In some embodiments, other filters and/or coatings may be applied before or after the mask and may provide some light absorption as well. By reading the pixels activated by the power scale, the power of the incident laser light can be determined.

In some embodiments, when illuminated by a laser beam some of the pixels along power scale 435 can be completely saturated. For example, near the 100% transmission side of power scale 435, many of the pixels may be completely saturated. Near the 0% transmission side of power scale 435 the pixels will show either partial or no charge. At some point in between these extremes the pixels change from fully saturated to partially charged. The sum of moments across the x-axis (and/or y-axis depending on the orientation of the power scale) of the power scale divided by the total power along the axis can provide the center of the average moment. Knowing the average moment location, the non-linear jump between partially filled wells can be determined, which indicates where saturation occurs.

FIG. 4 also shows wavelength scale 440 that can be a line shaped aperture in the mask that includes a wavelength filter that varies along the length of the line. This aperture can include a wavelength filter that filters light across the spectrum along the length of the line. In this way, the wavelength of the incident laser beam can be determined based on the activation of the pixels beneath the line-shaped aperture of power scale 435. A low wavelength laser beam, for example, will only activate pixels beneath a certain portion of line-shaped aperture of wavelength scale 440. And a laser beam with a different wavelength will activate pixels under a different portion of line-shaped aperture of wavelength scale 440.

Wavelength scale 440 can include a line in the mask that is 15 microns wide. Various other widths can be used, for example, 5 microns, 10 microns, 20 microns, 25 microns, 30 microns, 35 microns, etc. The length of the line can vary. Wavelength scale 440 can have a gradient of coatings ($SiO_2$, SiN, other oxide/nitride films, other colored films) that act as a wavelength filter with optical properties vary across the length of that slit. For example, some wavelength scales can block all frequencies except for a small band with different frequencies being permitted at different locations. In other examples, all frequencies can be allowed except for a small band that varies across wavelength scale 440.

Both power scale 435 and wavelength scale 440 may require a correction based on the incident angle.

FIG. 5 shows K-mask 500 with the vertical portions of the "K" as line-shaped aperture 520 that is connected all the way through the lined according to some embodiments of the invention.

FIG. 6 shows L-mask 600 that includes L-shaped pattern of circular apertures 605. Any number of shapes, patterns, and/or combinations of apertures can be used.

Figure 7:
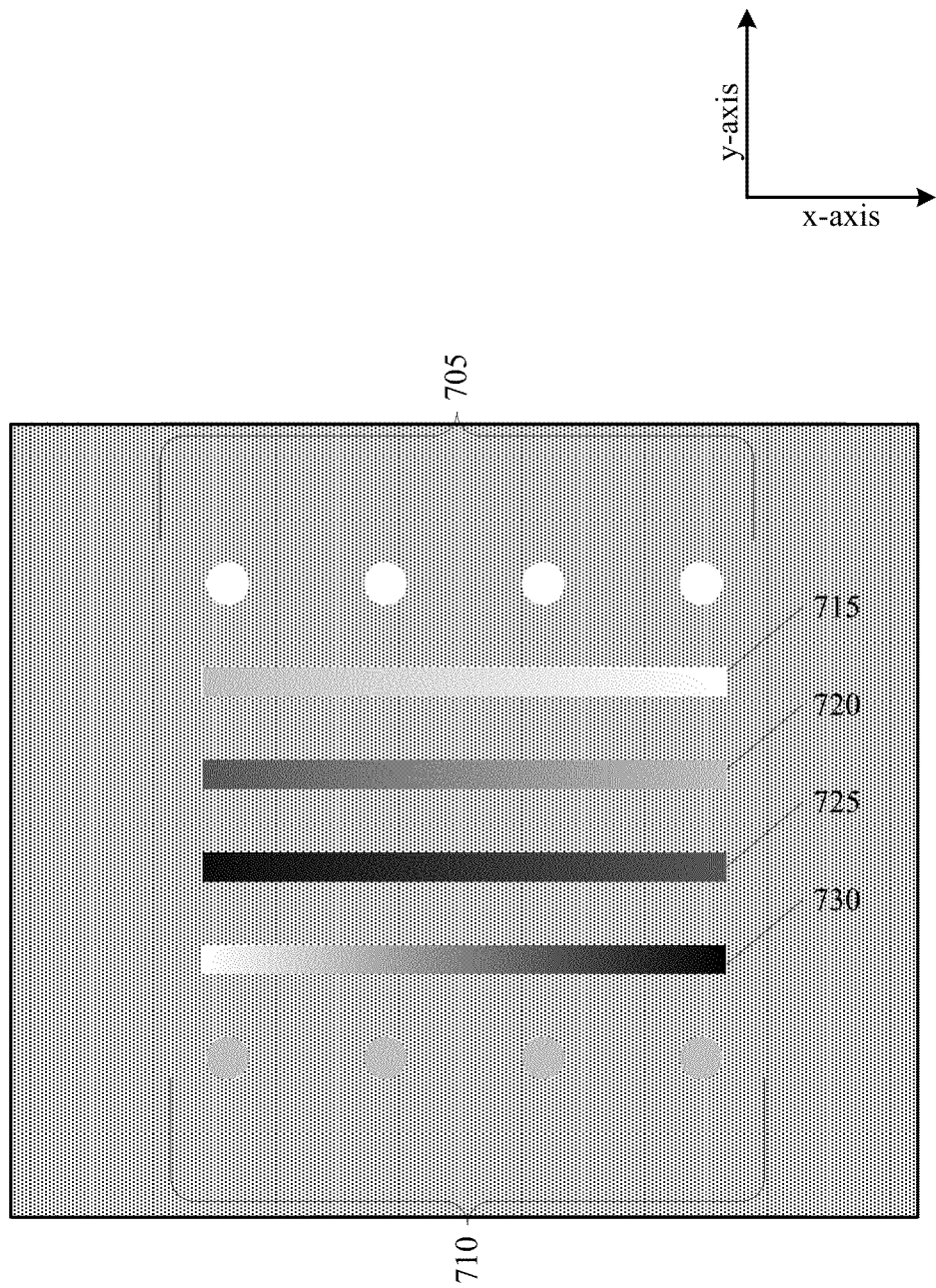
FIG. 7 shows an example of precision apertures, power scales, and wavelength scales according to some embodiments of the invention.

FIG. 7 shows an example of reference window 700 that includes a plurality of precision apertures, power scales, and a wavelength scale according to some embodiments of the invention. Reference window 700 can include two rows of circular apertures and four line apertures. Circular-shaped apertures 705 can include any number of circular apertures and can be used to determine the incident angle of a light beam using the mask in combination with a sensor array. Circular-shaped apertures 705, for example, can be used to determine the incident angle for a low power light beam. Circular apertures 710, for example, can be used to determine the incident angle for a high power light beam and may include a filter that reduces the transparency of the apertures.

Circular-shaped apertures 705 and/or 710 can have a diameter of about 4 pixels or about 20 microns. Circular-shaped apertures 705 and/or 710 can be made with any diameter, for example, 4 pixels, 6 pixels, 12 pixels, 14 pixels, 16 pixels, 18 pixels, etc. Or circular-shaped apertures 705 and/or 710 can have other diameters, for example, 5, 8, 10, 12, 15, 18, 22, 25, 30, 35 etc. microns.

Power scales 715, 720, and 725 can each include a line aperture in the mask that includes an intensity filter that varies from transparent to opaque along the length of the line. That is, each power scale 715, 720, and 725 can include a filter that varies in opacity from one side of the line aperture to the other side. Each power scale can be used for different power intensity profiles (e.g., low power, medium power, and high power). In other embodiments, a single line can be used with a single wavelength filter. Any number of lines and/or filters can be used. Power scales 715, 720, and 725 can be similar to power scale 435 and vice versa.

Wavelength scale 730 that can be a line aperture in the mask that includes a wavelength filter that varies along the length of the line. Wavelength scale 730 can be similar to wavelength scale 440 shown in FIG. 4.

Figure 8:
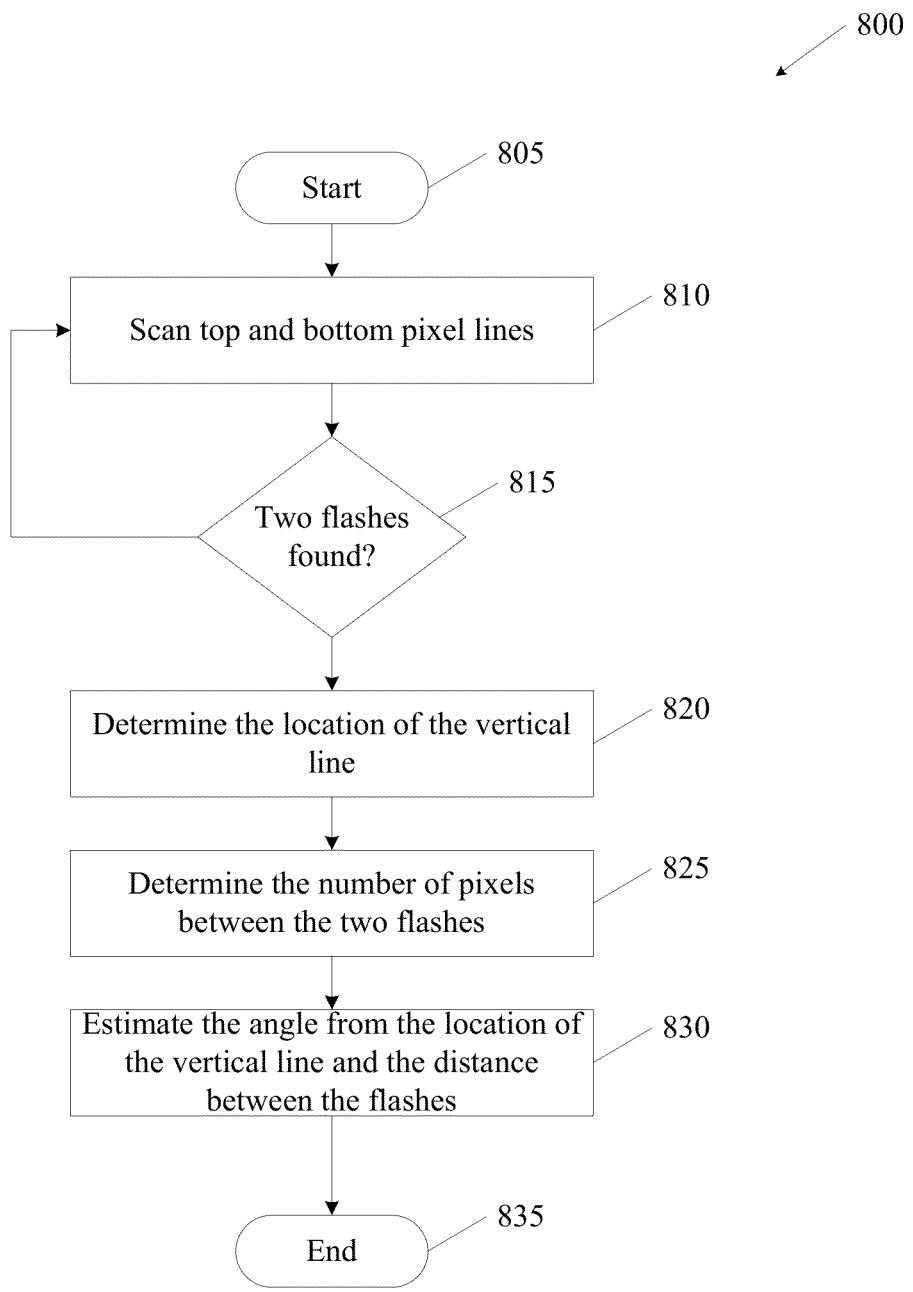
FIG. 8 shows a flowchart of a process that can be used to determine the incident angle of an incoming beam of light using a K-mask according to some embodiments of the invention.

FIG. 8 shows a flowchart of process 800 for determining the incident angle of an incoming beam of light using a K-mask according to some embodiments of the invention. A K-mask has a y-axis parallel with the vertical line of the "K" of the K-mask, and x-axis perpendicular with the y-axis. Process 800 starts at block 805. At block 810, the top and bottom (or first and last) lines of the sensor are scanned. By scanning only the pixels at the top and bottom lines of the sensor, process 800 can quickly determine when a laser beam is incident on the sensor. This can speed up processing and identification. Moreover, by using a K-mask with vertical lines (e.g., line-shaped apertures 420, 421, and 520) and angled lines (e.g., 425, 426) that extend to the top and bottom lines of the sensor or beyond, process 800 can determine when a laser beam is incident (e.g., a flash) on the sensor without scanning beyond these lines because the top and/or bottom line of pixels will always be illuminated no matter the incident angle of the light.

When a laser beam is incident on the sensor two flashes may be found along either or both the top line of pixels or the bottom line of pixels. A flash may comprise one or more activated pixels (e.g., the number of pixels corresponding with the width of the line) that are activated by light form the laser beam. If, at block 815, no flashes are found, then process 800 returns to block 810. If two flashes are found at either or both the top line of pixels or the bottom line of pixels then process 800 proceeds to block 820.

At block 820, the position of the vertical line of the "K" can be determined along the x-axis. The position of the vertical line can be determined using, for example, the center of the line or one of the line edges. The center of the line can be determined in a number of ways, for example, using a moment function described herein. The edge of the line can be determined by noting where the activated pixels along the vertical line are above a threshold value. Once the position of the vertical line is determined, an x-axis offset from the zero-angle position can be determined.

At block 825, the number of pixels between the two flashes can also be determined at the top or bottom line of pixels. The second flash can be from one of the angle lines from the K-mask. The number of pixels between the two flashes can be determined between the center of the lines or one of the edges of the lines.

At block 830, the incident angle of the light can be determined. From this x-axis offset, the incident angle of the light along the x-axis can be determined, for example, using a simple tangent function along with knowledge of the distance between the mask and the sensor or using a table of calibration data. The incident angle along the y-axis can be determined using the distance between the two flashes. Using the slope of the angle line of the "K" in the K-mask and the distance between the two flashes the y-axis offset can be determined. Using this y-axis offset, the incident angle of the light along the y-axis can be determined using a simple tangent function along with knowledge of the distance between the mask and the sensor. From these two angles, the overall angle of the light can be determined.

Process 800 can end at block at block 835. The blocks shown in process 800 can occur in any order. Moreover, additional blocks can be added and some blocks may be eliminated.

Figure 9:
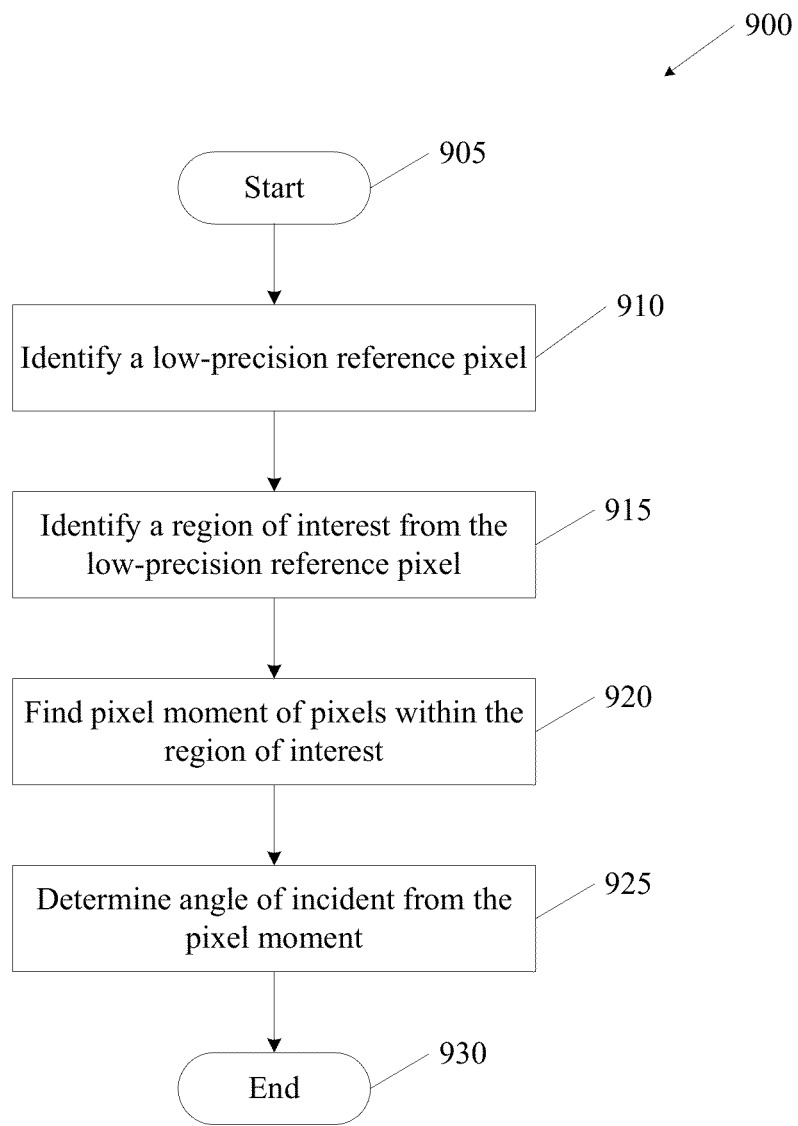
FIG. 9 shows a flowchart of a process that can be used to determine an incident angle of light on a sample according to some embodiments of the invention.

FIG. 9 shows a flowchart of process 900 for determining an incident angle of light on a sample according to some embodiments of the invention. Process 900 can be used to determine an incident angle using a circular aperture (e.g., any of circular-shaped apertures 430, 705, or 710). Process 900 starts at block 905.

At block 910 a first reference pixel can be identified. The first reference pixel can be found by scanning consecutive rows from either the top row or the bottom row of the sensor until a pixel is found that has energy above a threshold value. Of course, information from a K-mask can be used as a starting point for scanning the sensor pixels. For example, using the vertical line in the K-mask, the offset of the light incident on the sensor through circular apertures (e.g., apertures 430, 705, and 710) can be estimated. Similarly the y offset can be estimated using the distance between the lines at the top or bottom row and the slope of the lines. With these offsets a starting point closer to pixels can be found.

The first reference pixel can be found by scanning the pixels. This can occur, for example, by starting at the bottom row and working upwards or by starting at the top row and working downwards. As another example, scanning can work by columns starting from either side. Moreover, scanning can start from any position (e.g. the position can estimated using offsets from the K-mask data). When an activated pixel is found, the level of activation can be compared with a threshold value. If the activation amount is greater than the threshold value, then the pixel is considered a first reference pixel and it is assumed that the pixel is part of a group of pixels activated by a laser beam through the first aperture. Because some pixels were ignored that are below the threshold value and/or because pixels are reset when they are read, this first reference pixel cannot be used to determine the center of all the activated pixels around this point from incident light through the first aperture. But, this first first reference pixel can be used to define a region of interest around activated pixels from light passing through a second aperture.

The pixel separation between circular apertures should be known. As such, once the first reference pixel is determined, a region of interest can be defined around pixels activated by the light passing through the second aperture using the known pixel separation between the first aperture and the second aperture as shown in block 915. As shown in FIG. 4, multiple circular apertures are shown with multiple regions of interest defined around each aperture.

The region of interest can be created with any size. For example, if the aperture has a 4 pixel diameter (e.g., the aperture in the mask can be large enough to illuminate a spot about 4 pixels in diameter), then a 32×32 pixel region of interest can be used. That is, the region of interest can have dimensions along both axes that are eight times the diameter of the aperture. Other examples, the region of interest can have dimensions along both axes that is 3, 5, 6, 7, 8, etc. times the diameter of the aperture.

In some embodiments the region of interest can be dynamically chosen or defined. For example, in systems using a K-mask a region of interest around circular apertures can be defined based on the x-offset and the y-offset provided by the vertical line and the angle lines in the K-mask. As another example, in systems using a different type of mask, the region of interest can be determined based on likelihood functions.

At block 920 the pixel moment of the region of interest can be determined. The pixel moment can be determined in a number of ways. For example, the energy collected by each pixel within the region of interest can be multiplied by the x offset from the origin of the region of interest. This creates a moment function (i.e. energy applied at a distance) along the x-axis from the origin of the region of interest. The moments can then be summed along the x-axis and divided by the average energy of the pixels in the region of interest. As another example, the moments in a line of pixels can be summed and divided by the sum of the pixel energy within the line. Regardless of the technique, the center of the intensity profile within the region of interest relative to the origin of the region of interest can be returned along the x-axis relative to the origin of the reference pixel. The same process can be used to return the center of the intensity profile along the y-axis relative to the origin of the reference pixel.

At block 920 the pixel coordinates of the center of activated pixels can be determined. By using moment techniques, the location of the center of activated pixels can be found with sub-pixel accuracy. Using this data, at block 925, the incident angle of the light beam can be determined. For example, using the pixel coordinates for the zero-angle intensity profile (e.g., from a calibrated measurement) the incident angle can be returned using a tangent function along with the distance between the mask and the sensor.

Process 900 can end at block 930. The blocks shown in process 900 can occur in any order. Moreover, additional blocks can be added and some blocks may be eliminated.

Figure 10:
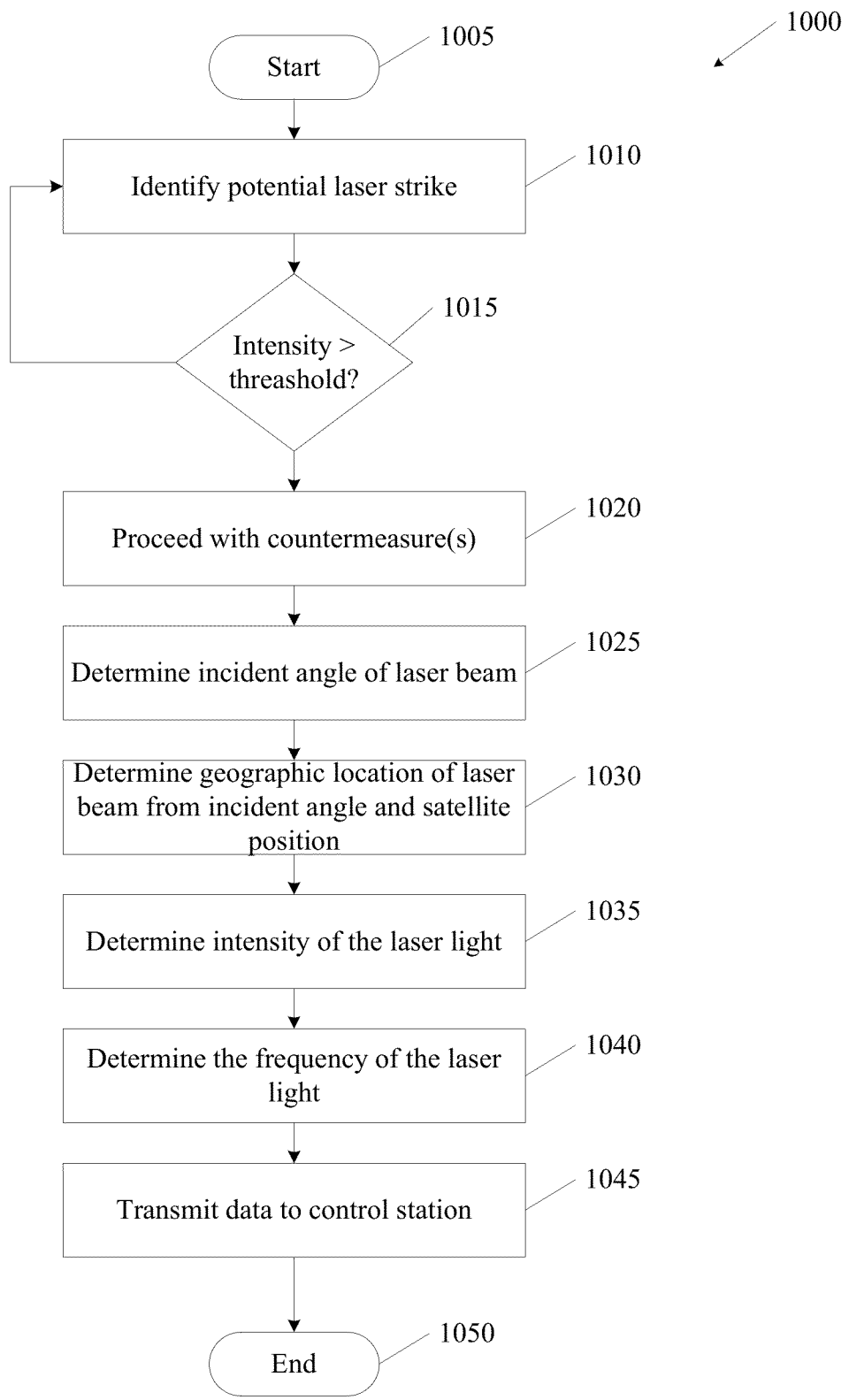
FIG. 10 shows a process that can be used by a satellite in response to an incident laser beam according to some embodiments of the invention.

FIG. 10 shows process 1000 that can be used by a satellite in response to an incident laser beam according to some embodiments of the invention. Process 1000 can start at block 1005. At block 1010 a laser beam can be identified. This can be done in any number of ways. For example, as described above in conjunction with FIG. 8.

At block 1015 it can be determined whether the intensity of the potential laser beam is greater than a threshold value. This can be accomplished in any number of ways. For example, the intensity of the potential laser beam can be determined by monitoring the pixels found below power scales (e.g., power scale 435, 715, 720, and/or 725). That is, if pixels found within a specific opacity filter level are activated, then the intensity of the potential laser beam is greater than the threshold level related to the opacity filter level. As another example, the intensity of activated pixels within a region of interest can be averaged and the average compared with a threshold value. If the intensity is below the threshold, then process 1000 returns to block 1010. If the intensity is above the threshold, then process 1000 proceeds to block 1020.

At block 1020, if the intensity is greater than the threshold value, then it is likely that the potential laser beam could be damaging and/or countermeasures should be undertaken. These countermeasures can include, for example, turning off optical sensors; closing apertures to optical sensors; and/or changing the roll, pitch, attitude, altitude, and/or yaw of the satellite. Various other countermeasures may be used.

At block 1025 the incident angle can be determined. This can be done using any number of techniques, some of which are described herein. From the incident angle, the position, and/or orientation of the satellite the geographic location of the source of the laser at block 1030. At block 1035 the intensity of the laser light can be determined. While the intensity of the laser beam was noted above and compared with a threshold value, in some embodiments, a more accurate intensity value can be determined.

At block 1040 the wavelength of the laser light can be determined. The wavelength can be determined using wavelength scale 440 or 730. Various other techniques may be used. At block 1045 data regarding the laser beam can be communicated to a control station. This data can include the time the laser beam was detected, the incident angle, the geographic location of the source of the laser, the attitude of the satellite, the pitch of the satellite, the yaw of the satellite, the roll of the satellite, the altitude of the satellite, the speed of the satellite, the wavelength of the laser light, the intensity of the laser light, and/or any countermeasures undertaken. Various other data can be communicated.

Process 1000 can end at block at block 1050. The blocks shown in process 1000 can occur in any order. Moreover, additional blocks can be added and some blocks may be eliminated.

Figure 11:
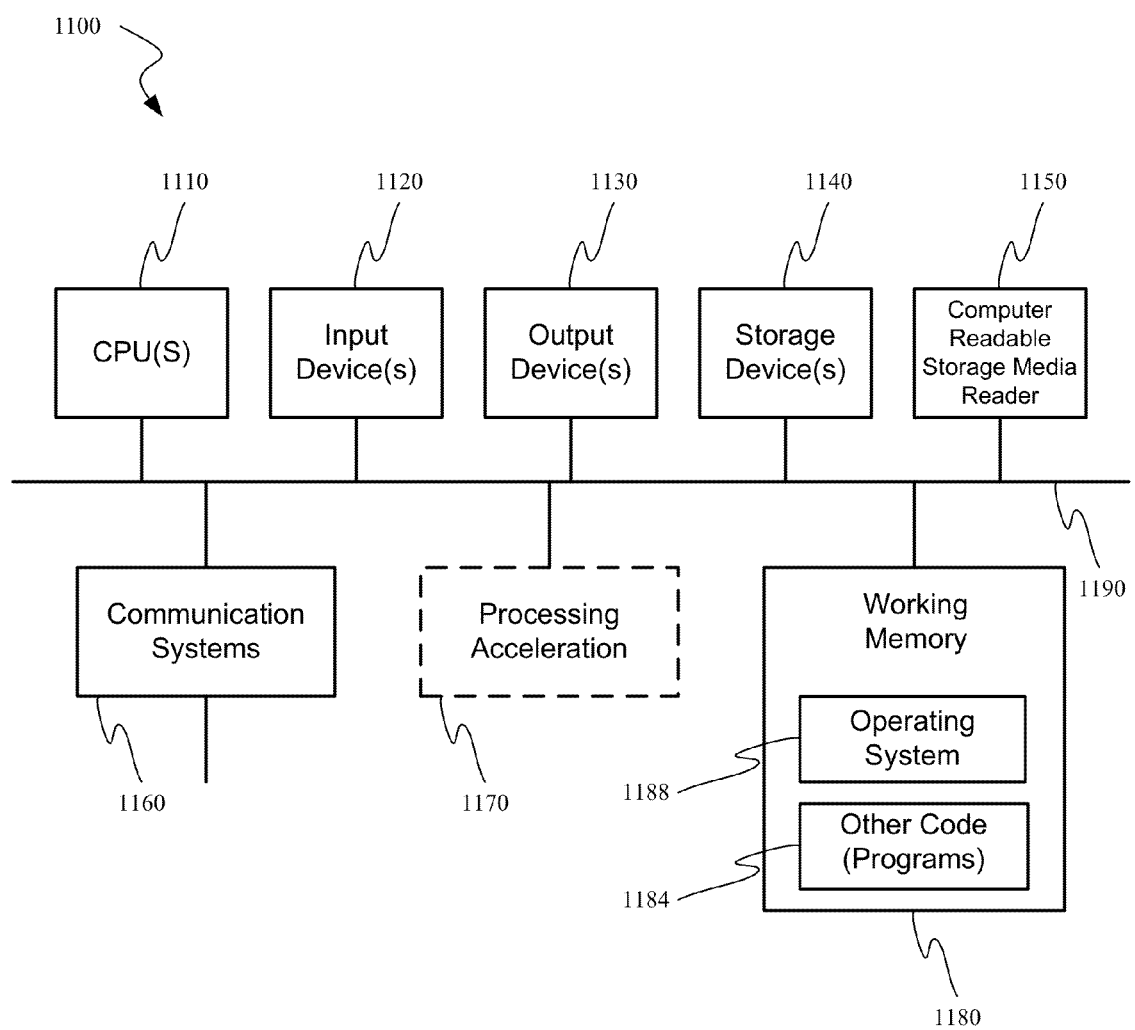
FIG. 11 illustrates a block diagram of a computer system capable of being used in at least some portion of the apparatuses or systems of the present invention, or implementing some embodiments of the invention.

FIG. 11 is a block diagram of computer system 1100 in which embodiments of the present invention may be implemented. For example, processes 300, 800, 900, and/or 1000 can be implemented using computer system 1100. Moreover, a satellite and/or ground station may implement computer system 1100.

This example illustrates a computer system 1100 such as may be used, in whole, in part, or with various modifications, to provide the functions of a satellite system, a sensor controller and/or other components of the invention such as those discussed above. Computer system 1100 may also be programmed using an FPGA.

Computer system 1100 includes hardware elements that may be electrically coupled via a bus 1190. The hardware elements may include one or more central processing units 1110, one or more input devices 1120 (e.g., a mouse, a keyboard, etc.), and one or more output devices 1130 (e.g., a display device, a printer, etc.). Computer system 1100 may also include one or more storage device 1140. For example, storage device(s) 1140 may be disk drives, optical storage devices, solid-state storage device such as a random access memory ("RAM") and/or a read-only memory ("ROM"), which can be programmable, flash-updateable and/or the like.

Computer system 1100 may additionally include a computer-readable storage media reader 1150, a communications system 1160 (e.g., a modem, a network card (wireless or wired), an infra-red communication device, Bluetooth™ device, cellular communication device, etc.), and working memory 1180, which may include RAM and ROM devices as described above. In some embodiments, computer system 1100 may also include a processing acceleration unit 1170, which can include a digital signal processor, a special-purpose processor and/or the like.

Computer-readable storage media reader 1150 can further be connected to a computer-readable storage medium, together (and, optionally, in combination with storage device(s) 1140) comprehensively representing remote, local, fixed, and/or removable storage devices plus storage media for temporarily and/or more permanently containing computer-readable information. Communications system 1160 may permit data to be exchanged with a network, system, computer and/or other component described above.

Computer system 1100 may also comprise software elements, shown as being currently located within a working memory 1180, including an operating system 1188 and/or other code 1184. It should be appreciated that alternate embodiments of computer system 1100 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 1100 may include code 1184 for implementing any or all of the function of the various elements of the architecture as described herein. For example, software, stored on and/or executed by a system such as computer system 1100, can provide the functions of the stored value provider subsystem, user subsystem, bill payment subsystem, gateway subsystem, and/or other components of the invention such as those discussed above. Methods implementable by software on some of these components have been discussed above in more detail.

Figure 12:
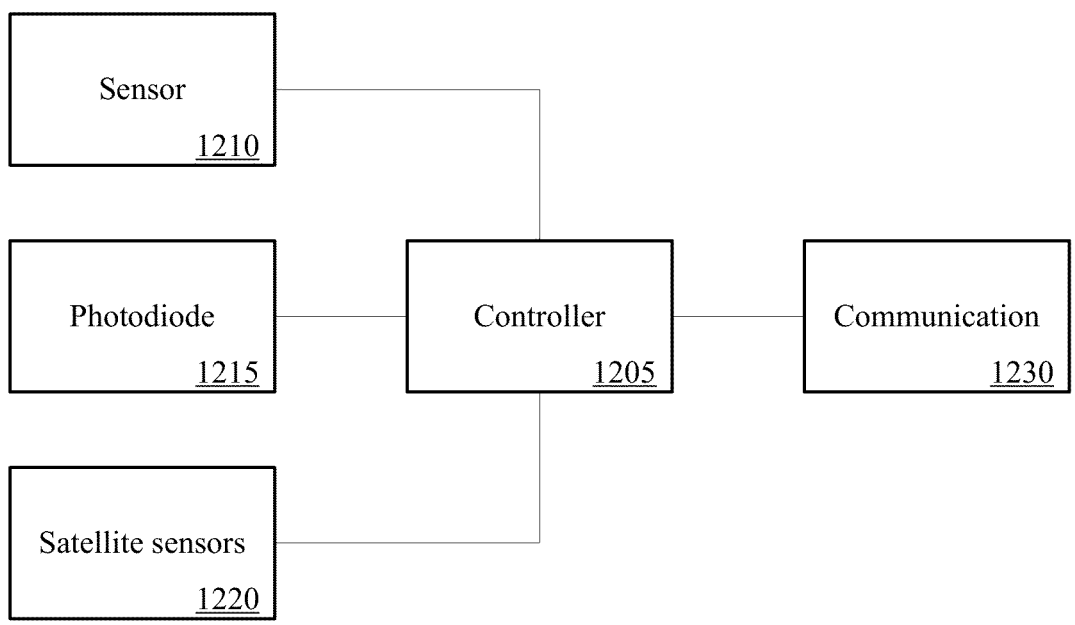
FIG. 12 is a block diagram of a satellite sensor system according to some embodiments of the invention.

FIG. 12 shows a block diagram of a satellite system according to some embodiments of the invention. Controller 1205 can be a computer system, for example, computer system 1100. Controller 1205 can also include a microprocessor or an FPGA. Controller 1205 can execute embodiments of the invention and/or can control processes or systems that participate in embodiments of the invention. Controller 1205 can be a standalone controller or part of the satellite controller.

Controller 1205 can be coupled with sensor 1210. Sensor 1210 can be the same as sensor 205 shown in FIG. 2. Moreover, sensor 1210 can be any sensor described herein. Photodiode 1215 can also be coupled with controller 1205. Various satellite-related sensors 1220 can also be coupled with the controller 1205. These sensors can provide data such as time, the attitude of the satellite, the pitch of the satellite, the yaw of the satellite, the roll of the satellite, the altitude of the satellite, the speed of the satellite, the pulse width of the laser beam, etc. Controller 1205 can also be coupled with communication 1230, which can provide communication with other components of the satellite and/or with a ground station.

In some embodiments the entire sensor may be globally reset at a predetermined rate. The pixels themselves have a dark current that will gradually increase the energy in each pixel (even when dark) such that it will skew our results. A reset can occur occasionally (i.e. once a second or something) to clear that energy.

In some embodiments the pulse rate (or pulse width) of the laser can also be determined. This data can be collected along with the data described in FIG. 10 and/or returned to the command center. The lasers beam can be pulsed at a particular pulse rate and with a particular pulse width.

If embodiments of the invention can detect a laser beam faster than the pulse rate, then there may not be any illuminated pixels in between each pulse at a frequency that corresponds to the pulse rate. But it can be straight forward to determine that the pulse rate is exactly the same as the inverse of the time between illuminated hotspots.

If embodiments of the invention can detect a laser beam slower than the pulse rate the difference in the measured power between each pulse can indicate the amount of power deposited during the time it took to read the row.

If the pulse rate of the laser beam is slower than the readout time of the sensor row, then some rows may not collect more power than adjacent rows. The frequency of when those rows do jump in energy is equal to the inverse of the time between reading the first row that doesn't change and the first row that does change.

If the pulse rate is faster than the readout time of the sensor row, but not equal to the same frequency as the readout time, then each row will show an increase in total energy and that increase will be constant in each adjacent row until one of the rows catches two pulses. The frequency of that jump will indicate the frequency of the pulse.

If the laser pulse rate exactly matches the frequency of the sensor each row can be read out, then there may not be a way to determine if the laser is a continuous wave laser or if it is a pulsed laser. Each row may show a constant increase in energy.

A microlens is a unique optical component that can be manufactured using micro fabrication techniques. The lens can be curved such that the photons entering the lens can either be concentrated on a point or defocused to a wider area. One example of a fabrication technique is where a small drop of photoresist polymer is placed on the surface of the substrate. Surface tension keeps the drop in a circular dome shape. This polymer is then cross-linked using UV radiation, and the micro-drop retains its lens-like shape.

In some embodiments microlens technology can be used to increase the resolution of the angle calculations without limiting the field of view. The lens can bend the light, directing photons onto the sensor that would have otherwise missed it.

Figure 13:
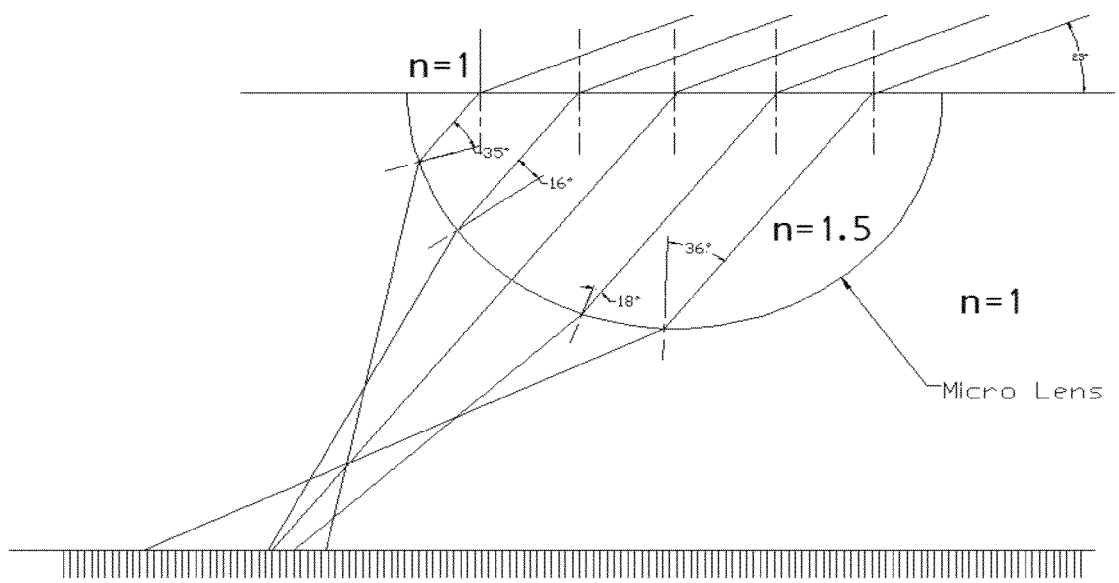
FIG. 13 shows an example of diffraction of photons entering a microlens according to some embodiments of the invention.

A microlens, can have small irregularities, due to the complexity of fabrication. These can be calibrated out by testing the sensor reading at different angles, and correcting any deviations within the software. FIG. 13 is an example of diffraction of photons entering a microlens that has an example index of refractivity of 1.5. The photons then emerge from the microlens into another media with an example index of refraction of 1. Note: indexes of refraction (n values) are adjustable at fabrication time and the values used in this example are only hypothetical for illustration purposes.

Figure 14:
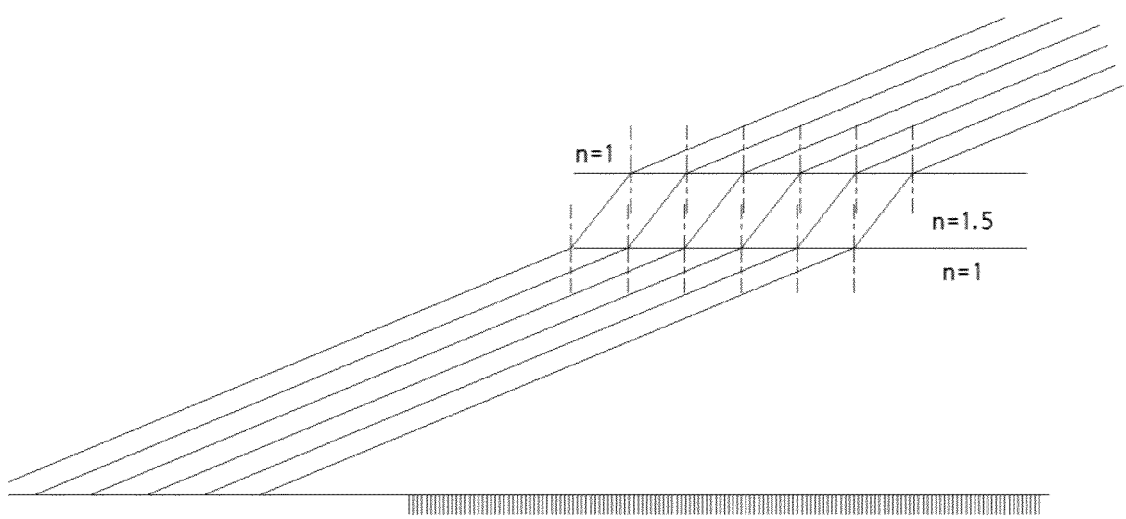
FIG. 14 shows an example of normal refraction of photons entering according to some embodiments of the invention.

FIG. 14 shows an example of normal refraction of photons entering a substance that has an example index of refractivity of 1.5. The photons then emerge from the substance into another media with an example index of refraction of 1. Note: indexes of refraction (n values) are adjustable at fabrication time and the values used in this example are only hypothetical for illustration purposes.

Pulsed lasers can have a particular frequency at which they pulse and duration as to how long the pulse is active. Some embodiments of the invention can determine the pulse rate using post-processing techniques, but may need an external sensor to calculate the pulse duration. Photodiodes may help with a direct measurement of the pulse rate as well as obtaining the pulse duration.

If a space-rated photodiode (such as PerkinElmer C30954E APD) were mounted near embodiments of the invention (e.g., photodiode 1215 in FIG. 12), the photodiode could activate with each pulse. The photodiode could be read at regular intervals to determine the pulse duration and frequency. This data can be inserted into the telemetry stream (see FIG. 10).

If the mask substrate sits directly on another substrate (e.g., cover glass), there may be an interface between the two substrates to discourage friction which could lead to cracking or scratching). In some embodiments a small ridge of photoresist can be included on the top layer to form the spacer needed to keep the mask off the cover glass. The photo resist spacer can provide vibration dampening, and "squishy" barrier between two rigid surfaces. The photoresist space can also protect the mask from scratching during placement.

Figure 15:
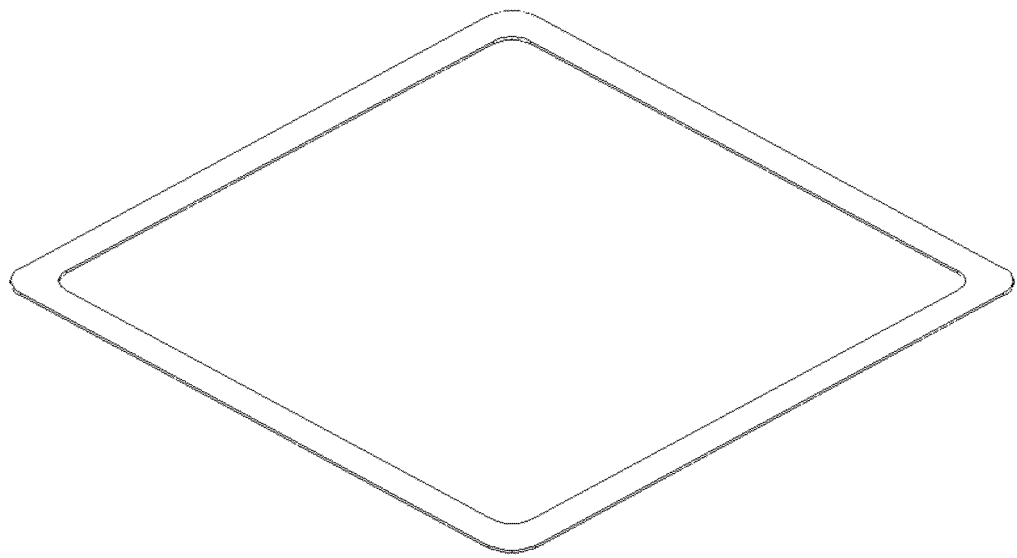
FIG. 15 shows a photoresist spacer with corners according to some embodiments of the invention.
Figure 16:
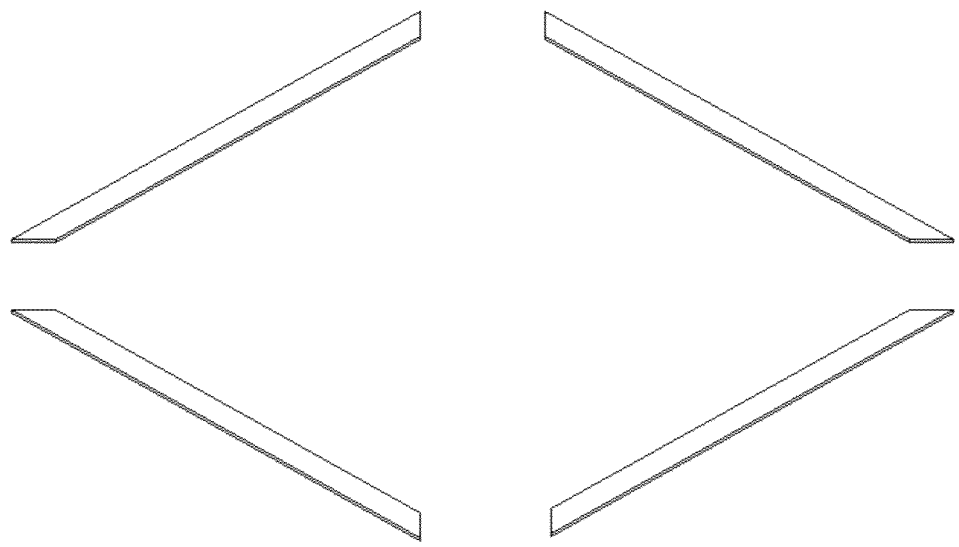
FIG. 16 shows a photoresist spacer without corners according to some embodiments of the invention.
Figure 17:
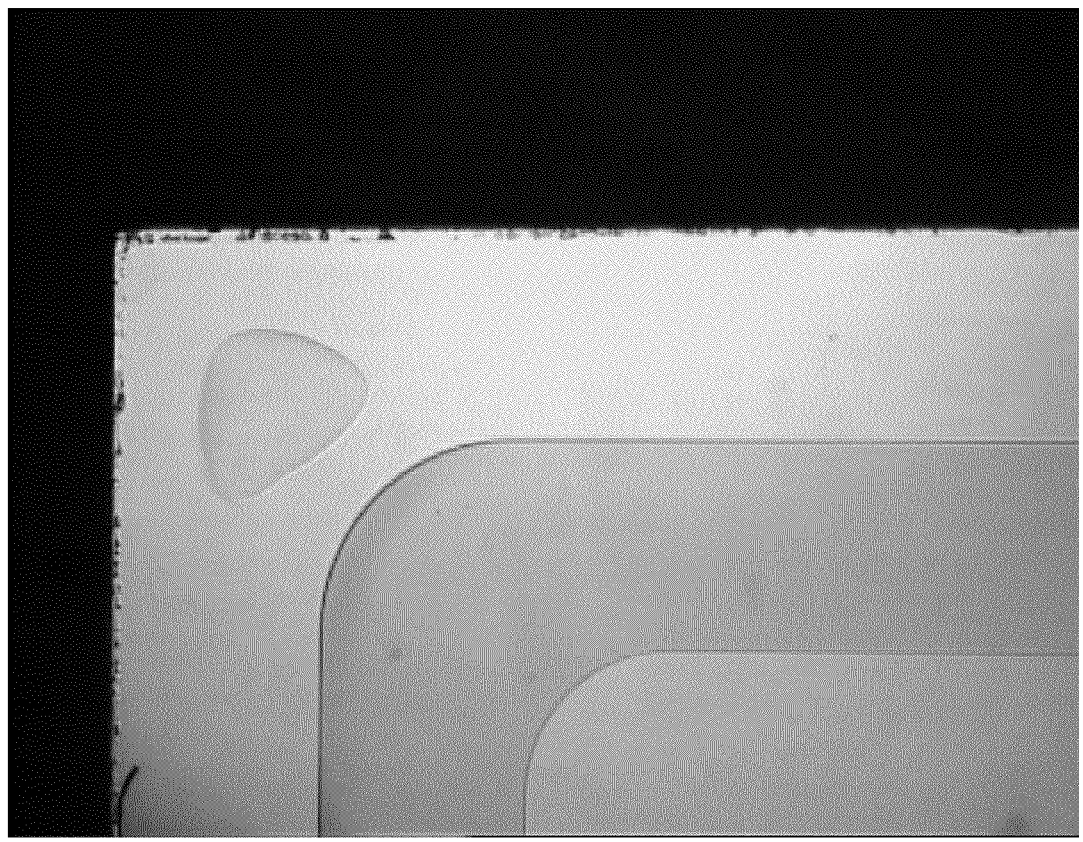
FIG. 17 shows a digital photomicrograph at 10× showing sample full spacer and small corner effect according to some embodiments of the invention.
Figure 18:
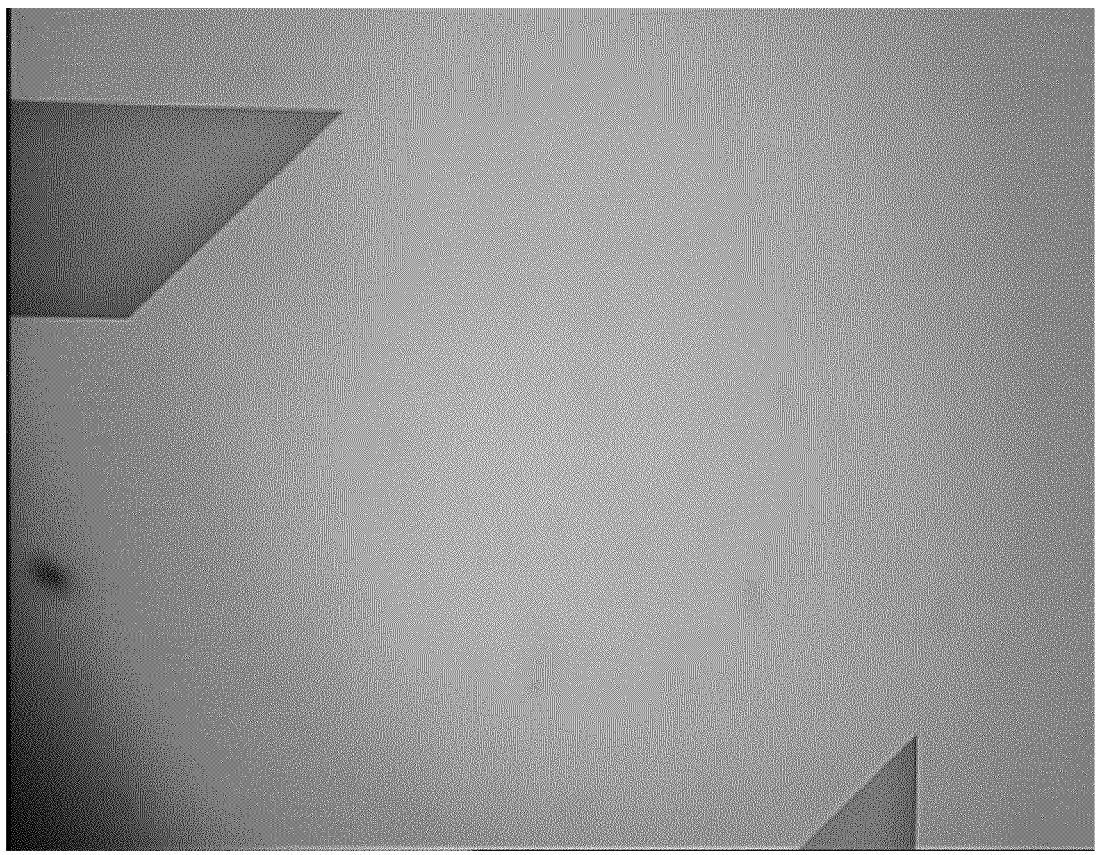
FIG. 18 shows a digital photomicrograph at 10× showing sample spacer without corners according to some embodiments of the invention.

FIG. 15 shows a full spacer that would be exposed on the mask. FIG. 16 shows a spacer with the corners removed. The spacer can be of any appropriate thickness. FIGS. 17 and 18 show examples of 2200 nm thick spacer imaged through a microscope.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method for identifying a laser beam incident angle using a mask having a K-shaped aperture, wherein the K-shaped aperture includes at least one vertical aperture and two angled apertures that extend to the top and/or bottom rows of pixels of a sensor, the method comprising:

scanning the first row of pixels and the last row of pixels of the sensor;

identifying two regions of activated pixels on either the last row or the first row of pixels of the sensor;

determining a first offset of the vertical aperture along a first axis;

determining the number of pixels between the two regions of activated pixels;

determining a second offset along a second axis orthogonal to the first axis using the number of pixels between the two regions of activated pixels; and determining a first incident angle of the laser beam from the first offset and the second offset.

2. The method according to claim 1, wherein the first offset is perpendicular with the vertical aperture.

3. The method according to claim 1, wherein the second offset is parallel with the vertical aperture.

4. The method according to claim 1, wherein the first offset and the second offset include a number of pixels between a calibration standard and the activated pixels.

5. The method according to claim 1, wherein the determining the first incident angle of the laser beam from the first offset and the second offset uses the slope of one of the two angled apertures.

6. The method according to claim 1, wherein the mask further includes at least one circular aperture and the method further comprises:
   determining a region of interest around activated pixels from light that passes through the circular aperture using the first incent angle of the laser beam;
   determining an offset of the activated pixels with the region of interest; and
   determining a second incident angle from the offset of the activated pixels.

7. The method according to claim 6, further comprising determining an intensity center of the activated pixels.

8. The method according to claim 7 wherein determining the intensity center comprises using a moment function.

9. A method for identifying a laser beam incident angle using a mask having a first circular aperture and a second circular aperture separated by a pixel offset, the method comprising:
   scanning the pixels of a sensor array for a pixel activated above a threshold value by light incident on the sensor array through the first aperture;
   determining the pixel coordinates of the pixel activated above the threshold value;
   defining a region of interest around pixels activated by light incident on the sensor array through the second aperture using the pixel offset between the first aperture and the second aperture;
   determining the center of the pixels activated by light incident on the sensor array through the second aperture;
   determining the offset of the center of the pixels activated by light incident on the sensor array through the second aperture from pixels activated from light incident on the sensor array through the second aperture from the zenith position; and
   determine the incident angle of the laser beam from the offset.

10. The method according to claim 9, wherein the scanning begins from either the top row, the bottom row, the rightmost column, or the leftmost column.

11. The method according to claim 9, wherein the determining the center of the pixels activated by light comprises determining a moment function of pixels within the region of interest.

12. The method according to claim 9, wherein the determining the pulse rate comprises determining the change in the number of photons captured by adjacent row of pixels and comparing to the readout frequencies of those rows.

* * * * *